Dec. 8, 1925.   1,564,268

J. P. PESSÔA

APPARATUS FOR USE IN CIPHERING AND DECIPHERING

Filed Sept. 6, 1923   2 Sheets-Sheet 1

Inventor
João Pinto Pessôa
per [signature]
Attorney.

Dec. 8, 1925.                                            1,564,268
J. P. PESSÔA
APPARATUS FOR USE IN CIPHERING AND DECIPHERING
Filed Sept. 6, 1923            2 Sheets-Sheet 2
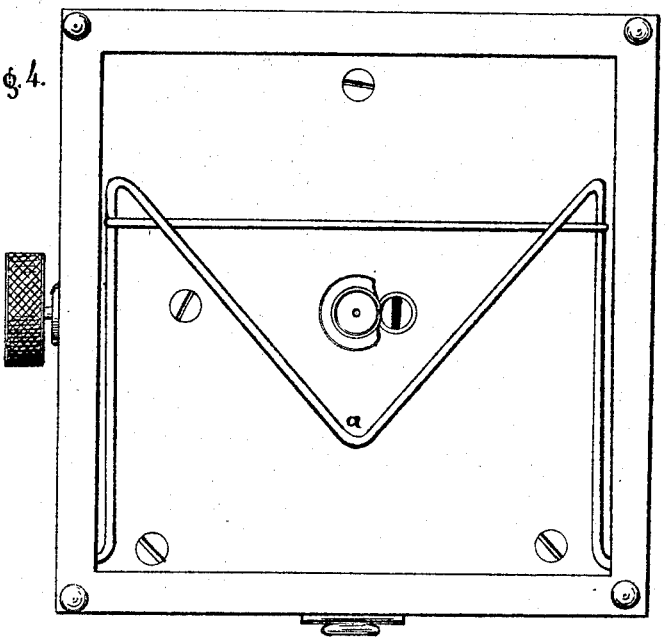
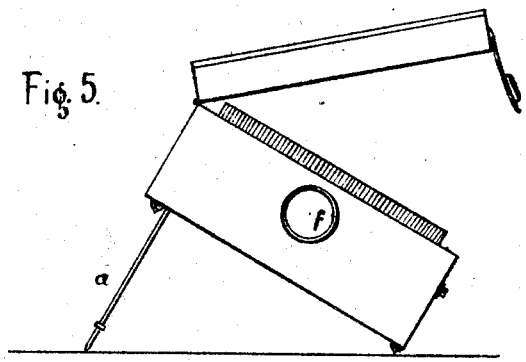
Inventor
JOÃO PINTO PESSÔA.
per
Attorney.

Patented Dec. 8, 1925.

1,564,268

UNITED STATES PATENT OFFICE.

JOÃO PINTO PESSÔA, OF RIO DE JANEIRO, BRAZIL.

APPARATUS FOR USE IN CIPHERING AND DECIPHERING.

Application filed September 6, 1923. Serial No. 661,283.

*To all whom it may concern:*

Be it known that I, João Pinto Pessôa, citizen of United States of Brazil, residing at Rio de Janeiro, Brazil, have invented certain new and useful Improvements in Apparatus for Use in Ciphering and Deciphering, of which the following is a specification.

This invention relates to an apparatus for use in ciphering and deciphering messages and the like, and in the example shown in the drawings consists of a gear enclosed within a small rectangular case, of, say, 8 centimetres wide by 4½ centimetres high.

In accordance with the present invention a pointer is adapted to rotate about an axis concentrically arranged within two annular series of letters and is carried on a disc having a hollow shaft enclosing a spindle capable of both rotary and endwise movement therein while a pointer carried on this spindle may engage one of a series of recesses in said disc, and a spring or the like is provided for retaining the spindle in such an endwise position that the pointer thereon is retained in one of the said recesses, and the spindle is shifted to release the pointer from said recess by means of a stud or knob.

It will be understood that the device has two annular series of characters which are printed or otherwise indicated upon a plate or disc or upon separate concentrically arranged annular plates.

In the accompanying drawings:

Fig. 4 is an inverted plan view; and

Fig. 5 is a side elevation showing the apparatus in position for use and with the cover partly open, this view being drawn to the same scale as Fig. 1.

The rectangular case has a bottom $r$ (see Fig. 2) which carries a bracket $a$ serving as bearings for a bevel gear $b$, $c$, the bevel wheel $c$ being operated by a spindle $e$ which extends through the side of the case and is provided at its outer end with a knob $f$.

The spindle carrying the bevel wheel $b$ is hollow and extends upwards through the front face $v$ of the apparatus, the upper end being fitted with a disc $g$ having a series of numbered recesses (preferably 13 or 26 in number) and having a projecting pointer $y$ secured thereon. Extending through the hollow spindle is an inner spindle $t$ having a stud $k$ on its lower end beneath the bottom $r$ and having a radial hand or pointer $h$ on its upper end.

Figure 1:
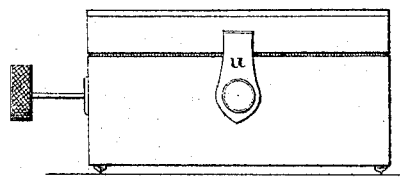
Fig. 1 is an external front elevation showing the apparatus closed.
Figure 2:
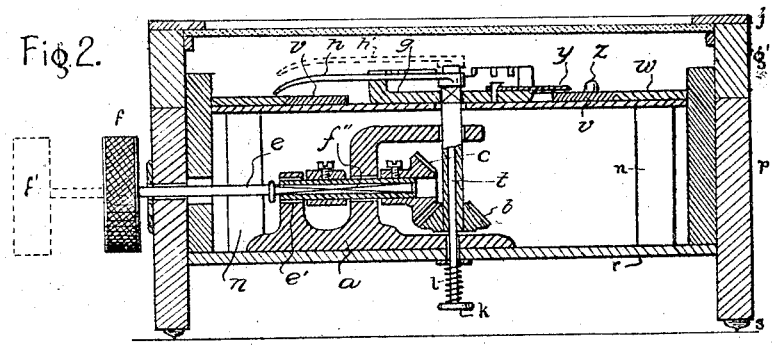
Fig. 2 is a front view drawn to a larger scale and showing the internal parts.
Figure 3:
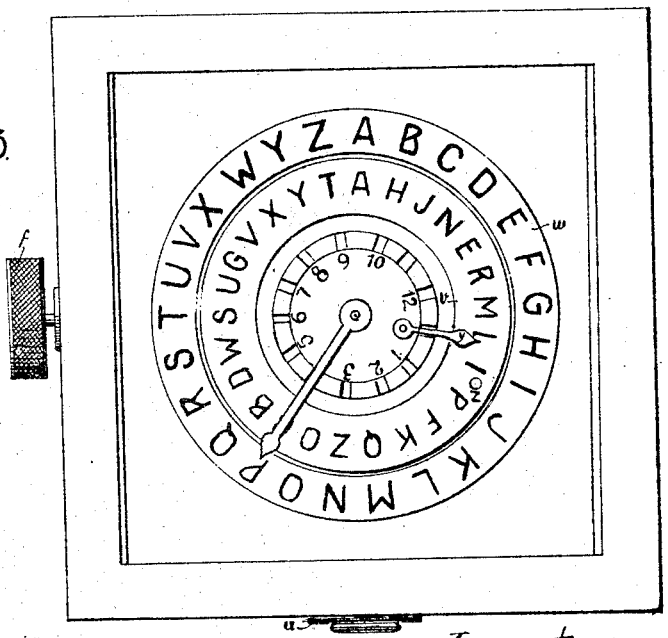
Fig. 3 is a plan view with the cover removed.

A small spiral spring $l$ located between the stud $k$ and the bottom $r$ retains this large pointer or index $h$ within one of the recesses of the disc $g$ (Figs. 2 and 3).

When the stud $k$ is pressed upwards, the spring $l$ is compressed and the index or pointer $h$ is raised to a sufficient height (as shown at $h'$), to release it from the recess in which it is lodged, and the pointer may then be turned into position to engage any other recesses.

The face plate $v$ rests on four posts $n$, and mounted upon this face plate are two concentric rings each being divided into 26 spaces with the 26 letters of the alphabet marked thereon, the outer ring $w$ preferably having the letters printed thereon in black while the inner ring $v$ has its letters printed in red.

The inner ring with the letters in red may be turned or displaced in a circular direction, so that the letters may take up any desired position.

In this way the rings $w$, $v$ and the alphabets of the two circular series of letters may be varied according to the operator's desire, and may be turned to any one of 26 different positions.

The apparatus is operated by the knob $f$ through the medium of the bevel gear $b$, $c$.

The spindle to which the knob $f$ is attached has a squared portion $f$ adapted to slide within a correspondingly formed socket in a spindle $e'$ carrying the bevel wheel $c$, the spindle $e'$ being of tubular form to receive the inner spindle $e$ and the knob is first brought to the position indicated in dotted line $f'$ (Fig. 2) in order to facilitate the operation, and after operation the knob $f$ and its spindle are returned to their innermost position. When the knob is in the position $f'$ it may be more conveniently grasped by the fingers, and the operation is thus greatly facilitated.

The hinged cover of the case has a glass insert so that the operation of the device may be accomplished without opening the cover which is fastened by means of pivoted catch or lock $u$.

The apparatus may thus be used with the cover locked, and it is necessary to unlock the cover only when it is desired to displace the inner ring *v* containing the red characters when it is necessary to change the cipher.

This displacement of the inner ring *v* is effected, after having opened the cover (as in Fig. 5), by means of a projection *z* (Fig. 3), which facilitates the displacement in a circular direction of the ring *v* with the red characters.

The stationary index or projecting pointer *y* (Fig. 3) indicates the red characters and the movable index, or larger pointer *h*, indicates the black characters.

The apparatus is used as follows:—When the written words or correspondence have to be ciphered from plain language, the supporting stand *a* of the apparatus is turned down as shown at Fig. 5 to rest on the table and thus support the device in an inclined position. With the thumb and forefinger of the left hand a rotary motion may then be given to the knob *f* and both pointers, as well as the disc *g*, with which they are connected will be operated through the medium of the bevel gear.

If, for example, the large pointer or hand *h* of the device be placed in the recess 4, and if A of the red characters corresponds as at Fig. 3 with A of the black ones, the ciphering may be started as follows: If, for instance, the first word of the correspondence which has to be ciphered be —"VICTORIA"—, the large pointer *h* is turned to the letter "V" (first letter of the word "VICTORIA") of the black type on the outer ring and it will be seen that the letter indicated by the small index on the red type on the inner ring is "Z"; the large index *h* is then turned to the letter I (second letter of the word to be ciphered) of the black characters and in this way the small index will indicate the letter A of the red characters; which is to be written after Z already obtained, forming ZA: then carrying the large index to the letter C (third letter of the word to be ciphered) the small index will indicate the letter U which has also to be written after the two letters already found, thus forming ZAU; and following this method with the remaining letters t, o, r, i, a of the word "VICTORIA" will be found the following letters indicated by the small index, viz—k, m, p, a, w, which, written after the three letters already given, will form ZAUKMPAW, which is the cipher of the word "VICTORIA."

In order to decipher words of correspondence it is necessary to proceed in the reverse way; for example, in deciphering the word "UTPAFMK" the small index is carried to the letter U (first letter of the word to be deciphered) of the red type and it will be found the letter indicated by the large index will be C, to be written. Then the small index will be carried to the letter T (second letter of the said word) of the red type, and it will be found that the letter of the black type, indicated by the large index, is H to be written after the first one, forming CH, and continuing in the same way for the remaining letters of the word to be deciphered, it will be formed, by the large index, the indications r, i, s, t, o— therefore, the translation of the word UTPAFKM is the word CHRISTO.

In order to change the cipher, the stud *k* on the spindle *t* is pressed upwards until the large index is released from the recess in the disc *g* which may then be turned by means of the knob *f*, and the large index *h* may then be allowed to engage any of the recesses numbered from 1 to 12. In case of need, it is also permitted to vary the cipher, as follows: Opening the upper movable lid or cover of the case and with the fore-finger of the right hand the ring with the red type may be turned through any desired angle by means of the small projection *z* (Fig. 3). Thus, once the small ring is displaced, the letter A of the red type does not correspond any more with A of the black type and will then correspond with any other letter as may be desired, and in this way the cipher is conveniently changed. With this apparatus a message cannot be translated, even by those having the apparatus if they do not possess the key employed in the ciphering.

The key referred to will consist of a preliminary agreement between the correspondents according to which the pointer will be placed at any of the numbers of the sockets, and the letter A of the red type will be placed opposite any of the letters of the black type.

Thus the apparatus is of great utility in the departments of the high administration of the country for documents and correspondence by telegraph, by post and or by bearer, and is also very useful for trade or business purposes.

Having now fully described my invention, what I claim is:

1. An apparatus for use in ciphering and deciphering messages and the like comprising a case, a pair of concentric rings mounted within the case and having the letters of the alphabet marked on each ring, a disc member mounted concentrically within the said rings and having a circular series of numbered recesses therein, a pointer permanently secured on the disc and indicating one or other of the letters on one of the rings, a hollow shaft carrying said disc member, means whereby the hollow shaft is rotated in the operation of the apparatus, a spindle mounted in the hollow shaft and capable of both rotary and endwise movement therein, a pointer secured on said spindle and engaging one or other of the said recesses and indicating one or other of the letters on the other ring, means for retaining the spindle in such an endwise position that the latter pointer is retained in a recess, means whereby the spindle is shifted to release the pointer from the recess and whereby the spindle may be rotated to bring it into position for engagement with a different recess.

2. Apparatus according to claim 1, in which the means for rotating the hollow shaft comprises a pair of bevel gear wheels, a second shaft for operating said gear wheels, and a knob secured on the end of the latter shaft externally of the case.

3. Apparatus according to claim 1, in which the means for shifting the spindle in an endwise direction to disengage the pointer from the said recess comprises a knob secured on the spindle end beneath the bottom of the case.

4. Apparatus according to claim 1, in which the means for shifting the spindle in an endwise direction to disengage the pointer from the said recess comprises a knob secured on the spindle end beneath the bottom of the case, and in which the means for retaining the pointer in engagement with the said recess comprises a spiral spring mounted upon the spindle in compression between the bottom of the case and the knob on the spindle end.

In testimony whereof I have hereunto set my hand.

JOÃO PINTO PESSÔA.